(12) United States Patent
Luo

(10) Patent No.: US 12,537,924 B2
(45) Date of Patent: Jan. 27, 2026

(54) 4K IMAGE ACQUISITION METHOD AND INFRARED THERMAL IMAGING SYSTEM

(71) Applicant: Dongguan Xintai Instrument Co., Ltd., Dongguan (CN)

(72) Inventor: Guodong Luo, Dongguan (CN)

(73) Assignee: Dongguan Xintai Instrument Co., Ltd., Dongguan (CN)

( * ) Notice: Subject to any disclaimer, the term of this patent is extended or adjusted under 35 U.S.C. 154(b) by 0 days.

(21) Appl. No.: 18/966,256

(22) Filed: Dec. 3, 2024

(65) Prior Publication Data

US 2025/0097390 A1  Mar. 20, 2025

(30) Foreign Application Priority Data

Sep. 9, 2024 (CN) .......................... 202411257807.3

(51) Int. Cl.
*H04N 7/18* (2006.01)
*H04N 9/31* (2006.01)
*H04N 23/11* (2023.01)

(52) U.S. Cl.
CPC ........... *H04N 9/3188* (2013.01); *H04N 23/11* (2023.01)

(58) Field of Classification Search
CPC .................................................... H04N 9/3188
USPC ......................................................... 348/165
See application file for complete search history.

(56) References Cited

U.S. PATENT DOCUMENTS

| | | | |
|---|---|---|---|
| 2009/0115721 A1* | 5/2009 | Aull ...................... | G06F 3/0425 348/E5.029 |
| 2009/0225097 A1* | 9/2009 | Van Belle ................ | H04N 5/21 345/597 |
| 2011/0310060 A1* | 12/2011 | Li ........................... | G06F 3/042 345/175 |
| 2014/0368641 A1* | 12/2014 | Strandemar ............... | G06T 3/00 348/136 |
| 2015/0172545 A1* | 6/2015 | Szabo ....................... | G06T 3/00 348/36 |
| 2017/0277028 A1* | 9/2017 | Short ....................... | G06T 7/521 |
| 2018/0098039 A1* | 4/2018 | Yagi ..................... | H04N 9/3158 |
| 2020/0011889 A1 | 1/2020 | Toyoda | |
| 2020/0080944 A1 | 3/2020 | Liu et al. | |
| 2020/0393680 A1* | 12/2020 | Högstedt ............... | G01J 5/0853 |
| 2021/0049976 A1* | 2/2021 | Chang ................... | H04N 7/0132 |
| 2021/0258549 A1* | 8/2021 | Ghazaryan ........... | H04N 9/3105 |
| 2021/0306593 A1* | 9/2021 | Cheng ................. | H04N 9/3188 |
| 2022/0291150 A1 | 9/2022 | Sugiyama et al. | |
| 2025/0076486 A1* | 3/2025 | Burlina ................ | G01S 13/867 |

* cited by examiner

*Primary Examiner* — Leron Beck
(74) *Attorney, Agent, or Firm* — Zhigang Ma

(57) ABSTRACT

A 4K image acquisition method and an infrared thermal imaging system are provided and relate to the technical field of infrared thermal imaging. The system includes an infrared thermal image acquisition unit, a visible light image acquisition unit, an image combining unit, an XPR dithering unit, a control unit and a display chip; in the area where a heat-emitting object is located on the projection display, a non-synchronous display of the image of a heat-emitting object in the thermal infrared range and the visible light image of a heat-emitting object is formed. Due to the duration of vision created by the XPR dithering unit, the user can observe various characteristics of the heat-emitting object displayed in the image in the thermal infrared range and the visible light image, in the display area where the heat-emitting object is located.

10 Claims, 3 Drawing Sheets

4K IMAGE ACQUISITION METHOD AND INFRARED THERMAL IMAGING SYSTEM

TECHNICAL FIELD

The present disclosure relates to the technical field of infrared thermal imaging, and in particular to a 4K image acquisition method and an infrared thermal imaging system.

BACKGROUND

An infrared thermal imager is a device used to detect infrared radiation from a target object through infrared thermal imaging technology, convert an image of the temperature distribution of the target object into a visible light image through signal processing, photoelectric conversion, and other means. The principle of operation of an infrared thermal imager is based on the principle that all objects whose temperature is above absolute zero (−273° C.) emit infrared radiation. Thermal imagers use an infrared detector and an optical lens to produce a graphical image of the heat distribution of the infrared radiation of the object under test, which is reflected from the light-sensitive element of the infrared detector, resulting in an infrared thermal image corresponding to the heat distribution field on the surface of the object. By viewing the thermal image, you can observe the overall temperature distribution of the object under test and study the object's heat output and make decisions about the next step.

In a video generated by a modern infrared thermal imager by combining an infrared thermal image with a visible light image, the combined video is obtained as follows: each frame of the visible light image of a heat-emitting object is replaced by a thermal image of the target area of the heat-emitting object obtained by the infrared thermal imager at the same time, resulting in several frames of the combined image, which then are played frame by frame to form a combined video. When the user views the combined video, they can only see the outline of the heat-emitting object and the corresponding infrared image, but they cannot clearly observe the details of the movement of the heat-emitting object.

For some infrared thermal imaging systems that require users to monitor or observe target areas in real time, they cannot combine observed visible light conditions and unobservable thermal radiation conditions to make timely decisions about the situation.

SUMMARY

The present disclosure is intended to overcome the disadvantages described above, and offers a technical solution to address the above-mentioned technical problems.

To achieve the above purposes, the present disclosure provides the following technical solution: An infrared thermal imaging system includes an infrared thermal image acquisition unit, a visible light image acquisition unit, an image combining unit, an XPR dithering unit, a control unit, and a display chip; the infrared thermal image acquisition unit is used for obtaining infrared thermal images of the target scene; the visible light image acquisition unit is used for obtaining visible light images of the target scene; the image combining unit is used for extracting an image of the target area of the heat-emitting object from the obtained thermal images, and for combining the extracted image of the target area of the heat-emitting object with a visible light image to obtain the combined image; the controller of the control unit is used for projecting the combined image obtained by the image combining unit and the visible light image obtained by the visible light image acquisition unit using the display chip, and for controlling the XPR dithering unit when controlling the projection display, so that the display chip performs dithering; during the completion of each XPR dithering cycle, the display chip displays at least 2 frames of displayed images, and the displayed multi-frame images include at least 1 frame of the combined image and at least 1 frame of visible light image.

As a further embodiment of the present disclosure: the display chip is a 0.47 DMD display chip; the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

As a further embodiment of the present disclosure, the content displayed by moving up pixels with vision persistence and moving up pixels with vision persistence corresponds to the same type of image; The content displayed by pixels moving to the left with vision persistence and pixels moving to the right with vision persistence corresponds to the same type of image.

As a further embodiment of the present disclosure: the display is a 0.66 DMD display chip; the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

As a further embodiment of the present disclosure, all content displayed by pixels with vision persistence in the same direction in different XPR dithering cycles is the corresponding visible light images or the corresponding combined images.

The present disclosure also offers the following technical solution: a 4K image acquisition method, including
  obtaining a thermal image of the target scene and obtaining a visible light image of the target scene;
  forming a combined image by combining an infrared thermal image of the target area of a heat-emitting object with a visible light image;
  control of the display chip for performing a projection display of the combined image and the visible light image;
  control of the XPR dithering unit during projection display, so that the display chip performs dithering;
  during the completion of each XPR dithering cycle, the display chip displays at least 2 frames of displayed images, and the displayed multi-frame images include at least 1 frame of the combined image and at least 1 frame of visible light image.

As a further embodiment of the present disclosure: the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

As a further embodiment of the present disclosure, the content displayed by moving up pixels with vision persistence and moving up pixels with vision persistence corresponds to the same type of image; The content displayed by pixels moving to the left with vision persistence and pixels moving to the right with vision persistence corresponds to the same type of image.

As a further embodiment of the present disclosure: the display chip is a 0.66 DMD display chip; the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

As a further embodiment of the present disclosure, all content displayed by pixels with vision persistence in the same direction in different XPR dithering cycles is the corresponding visible light images or the corresponding combined images.

In comparison with the existing technology, the positive effects of this technical solution are that on the projection display, the area where the heat-emitting object is located corresponds to an asynchronous display that forms an infrared thermal image of the heat-emitting object and a visible light image of the heat-emitting object. Due to the duration of vision created by the XPR dithering unit, the user can get in the display area where the heat-emitting object is located, various characteristics of the heat-emitting object displayed in the infrared thermal image and in the visible light image. When receiving infrared television information about the heat-emitting object, the user can timelier detect the details of the object in visible light, this makes it easier for the user to decide, for example, whether the situation is dangerous; on a projection display, the area outside the heat-emitting object corresponds to a multi-pixel display that forms a visible light image, which improves resolution and effectively reduces the cost of displaying.

Additional aspects and advantages of the present disclosure will be given in part, as will become apparent from the following description or as will become known from the practice of the invention.

BRIEF DESCRIPTION OF THE DRAWINGS

In order to more clearly illustrate the accompanying drawings specific embodiments of the present disclosure or the prior art technical solutions, the drawings that need to be used in the description of the embodiments or prior art will be summarized below. Obviously, the following drawings will be briefly presented. only descriptions are provided. These are some embodiments of the present disclosure. For those skilled in the art, other drawings can be derived from these drawings without any creative effort.

The corresponding symbols in the drawings are explained as follows.

Infrared thermal image acquisition unit—1, visible light image acquisition unit—2, image combining unit—3, XPR dithering unit—4, control unit—5, display chip—6, First X-axis guide rail—401, second X-axis guide rail—402, first Y-axis guide rail—403, second Y-axis guide rail—404, slider—405, redundant part—405a, first coil—406, first magnet—407, second coil—408, second magnet—409, third coil—410, third magnet—411, fourth coil—412, fourth magnet—413.

DETAILED DESCRIPTION OF THE EMBODIMENTS

The technical solutions in the embodiments of the present disclosure will be clearly and fully described below in conjunction with the accompanying drawings in the embodiments of the present disclosure, and it is clear that the described embodiments are only part of the embodiments of the present disclosure, and not all embodiments. Based on the embodiments of the present disclosure, all other embodiments obtained by a specialist in this field without creative work fall within the scope of protection of the present disclosure.

Figure 1:
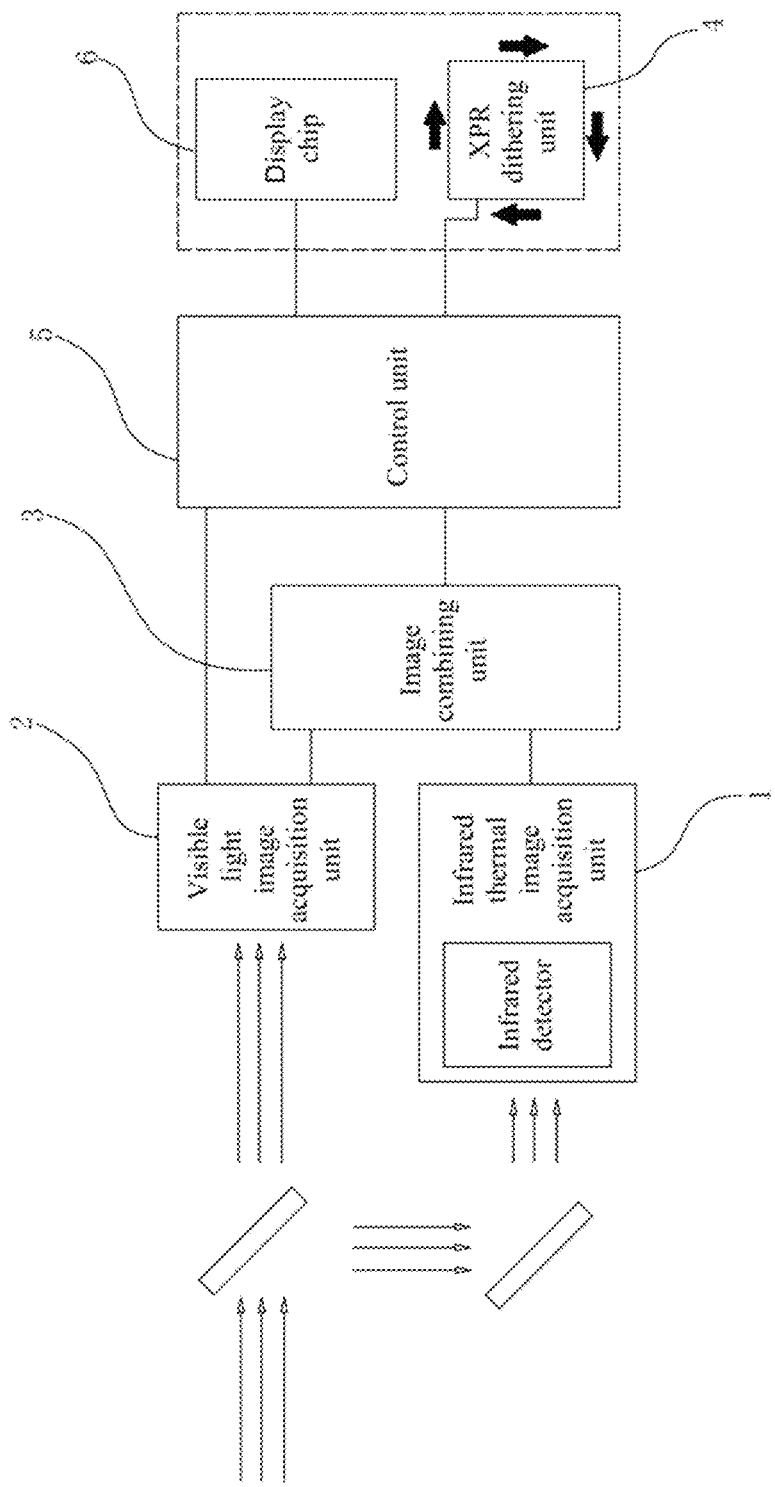
FIG. 1 is a block diagram of an infrared thermal imaging display system according to the present disclosure.
Figure 2:
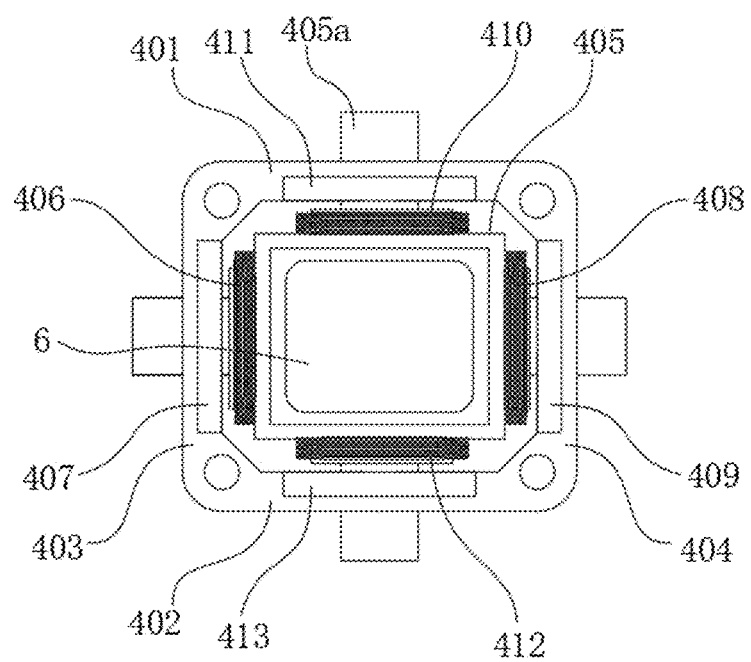
FIG. 2 is a schematic structural diagram of the XPR dithering unit in the present disclosure.
Figure 3:
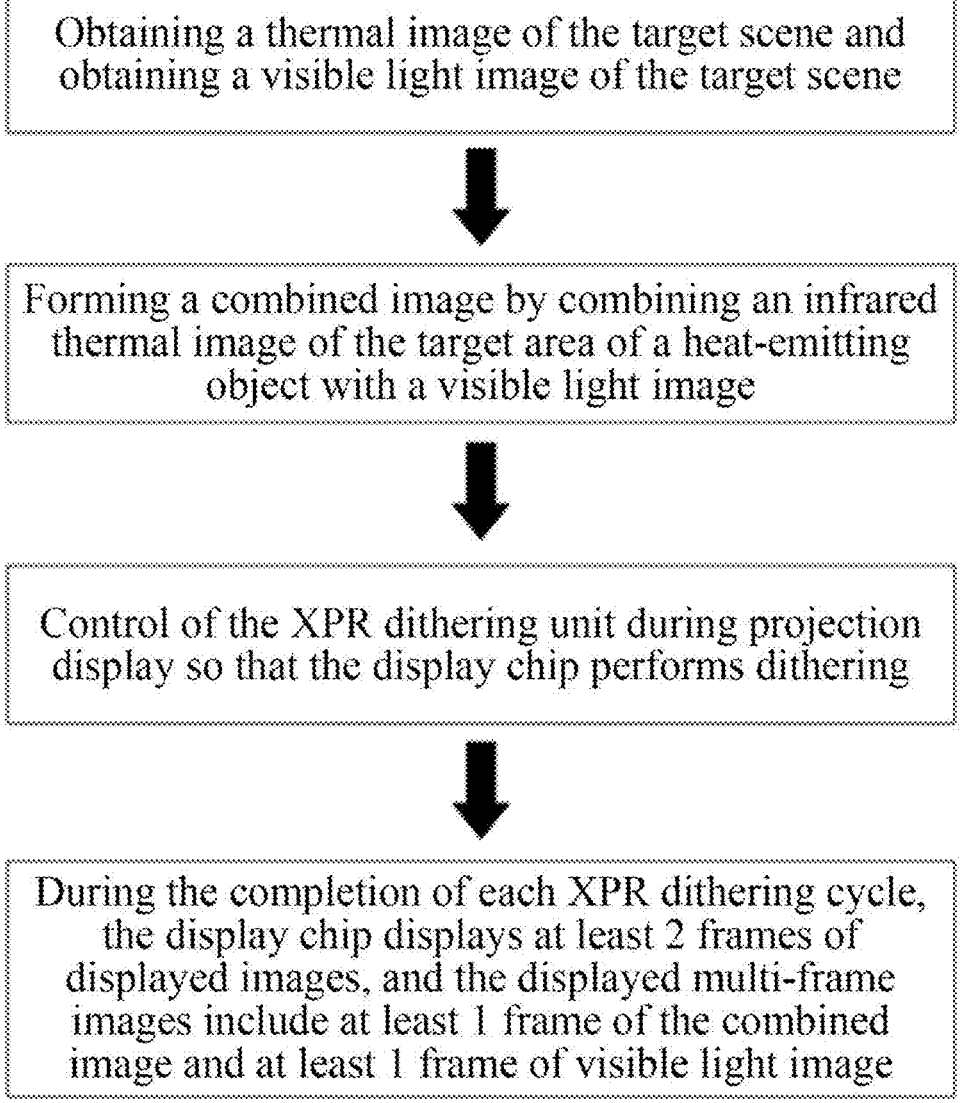
FIG. 3 is a block diagram of the 4K image acquisition method in the present disclosure.

With reference to FIGS. 1-3, an infrared thermal imaging display system, including an infrared thermal image acquisition unit 1, a visible light image acquisition unit 2, an image fusion unit 3, an XPR dithering unit 4, a control unit 5, and a display chip 6.

The infrared thermal image acquisition unit 1 is used for obtaining infrared thermal images of the target scene; the visible light image acquisition unit 2 is used for obtaining visible light images of the target scene; the image combining unit 3 is used for extracting an image of the target area of the heat-emitting object from the obtained thermal images, and for combining the extracted image of the target area of the heat-emitting object with a visible light image to get the combined image.

The controller of the control unit 5 is used for projecting the combined image, obtained by the image combining unit 3 and the visible light image, obtained by the visible light image acquisition unit 2, using the display chip 6, and for controlling the XPR dithering unit 4 when controlling the projection display, so that the display chip 6 performs dithering.

During the completion of each XPR dithering cycle, the display chip 6 displays at least 2 frames of displayed images, and the displayed multi-frame images include at least 1 frame of the combined image and at least 1 frame of visible light image.

On the projection display, the area where the heat-emitting object is located corresponds to an asynchronous display that forms an infrared thermal image of the heat-emitting object and a visible light image of the heat-emitting object. Due to the duration of vision created by the XPR dithering unit 4, the user can get in the display area where the heat-emitting object is located, various characteristics of the heat-emitting object displayed in the infrared thermal image and in the visible light image. When receiving infrared television information about the heat-emitting object, the user can timelier detect the details of the object in visible light, which makes it easier for the user to make a decision, such as whether a situation is dangerous.

On a projection display, the area outside the heat-emitting object corresponds to a multi-pixel display that forms a visible light image, which improves resolution and effectively reduces the cost of display.

In some embodiments, the XPR dithering unit 4 includes a guide platform with a slider capable of moving along the X-axis and Y-axis, whereby movement along the X-axis corresponds to the left and right directions, and movement along the Y-axis corresponds to the up and down directions.

The XPR dithering unit 4 also has an X-axis drive unit, designed to move the installed slider 405 on the guide platform with a slider to the left and right, as well as a Y-axis drive unit, designed to move the installed slider 405 on the guide platform with a slider up and down. The X-axis drive unit and the Y-axis drive unit can simultaneously move the slider 405 installed on the guide platform with a slider.

As shown in FIG. 2, in some embodiments, the guide platform with a slider has a first X-axis guide rail 401 that interacts with the upper part of the slider 405, a second X-axis guide rail 402 that interacts with the lower part of the slider 405, and a first Y-axis guide rail 403 that interacts with the left part of the slider 405, and a second the Y-axis guide rail 404 that interacts with the right side of the slider 405.

The first X-axis guide rail 401 and the second X-axis guide rail 402 have X-axis guide rail slot, running through the top and bottom, extending to left and right. The first Y-axis guide rail 403 and the second Y-axis guide rail 404 have guide slot, running through the left and right sides and extending up and down.

The construction of X-axis guide rail slot, extending to the left and right, is designed to guide the movement of the slider 405 when the slider 405 is moved by the X-axis drive unit. The construction of X-axis guide rail slot, running through the left and right sides, is designed so that when the slider 405 moves to the left and right, the left and right parts of the slider 405 can follow the corresponding Y-axis guide rail slots, thereby preventing jamming.

That is to say, the left and right parts of the slider 405 have their redundant part 405a sliding along the corresponding Y-axis guide rail slot. When the slider 405 moves to the right, the redundant part on the left side of the slider 405 can move to the right, enter the Y-axis guide rail slot (the first Y-axis guide rail), where the left part of the slider 405 was originally located. The redundant part on the right side of the slider 405 may move to the right to exit from the Y-axis guide rail slot (second Y-axis guide rail). Accordingly, the right part of the slider 405 can be moved to the right to enter the Y-axis guide rail slot (second Y-axis guide rail slot).

Redundant part on the left and right sides of the slider 405 allows sliding interaction of the slider 405 with the first Y-axis guide rail 403 and the second Y-axis guide rail 404 when the slider 405 moves to the left and right, which allows timely guidance of up and down movement when the slider 405 moves up and down.

Accordingly, the upper and lower sides of the slider 405 also have corresponding redundant part 405a to provide sliding interaction with the first X-axis guide rail 401 and the second X-axis guide rail when the slider 405 moves up and down.

As shown in FIG. 2, the first X-axis guide rail 401, the first Y-axis guide rail 403, the second X-axis guide rail 402, and the second Y-axis guide rail 404 are butt-connected to provide a rectangular frame structure or similar rectangular frame.

In some embodiments, the X-axis drive unit includes a first coil 406, installed on the slider 405 near the left side of the slider 405, and a second coil 408, installed on the slider 405 near the right side of the slider 405, as well as a first magnet 407, installed on the first Y-axis guide rail 403, corresponding to the first coil 406, and a second a magnet 409, installed on a second Y-axis guide rail 404, corresponding to the second coil 408.

The Y-axis drive unit includes a third coil 410, installed on the slider 405 near the top of the slider 405, a fourth coil 412, installed on the slider 405 near the bottom of the slider 405, and a third magnet 411, installed on the first axial guide 401, corresponding to the third coil 410, and a fourth magnet 413, installed on the second an axial guide 402, corresponding to the fourth coil.

By sequentially turning on the third coil 410, the second coil 408, the fourth coil 412, and the first coil 406, it is possible to achieve sequential magnetic attraction of the coils to the corresponding magnets, which will move the slider 405 in the direction of up, right, down, and left.

In some embodiments, in a continuous XPR dithering cycle: before the next coil is energized to drive the slider 405, the current applied to the previous coil (relative to the next coil that is next to it) is reduced to the magnetic extension maintenance current interval. The current in the magnetic extension maintenance current range is used to enable the magnetic attraction generated by the coil and the corresponding magnet to maintain the slider 405 at the end point corresponding to the travel route driven by the coil.

The interval of the magnetic extension maintenance current can be 10-20% of the excitation current.

Before applying voltage to the next coil to drive the slider 405, the voltage supply to the previous coil (relative to the one indicated above) is stopped.

After successively applying voltage to the third coil 410, second coil 408, fourth coil 412, first coil 406, the coils and corresponding magnets are successively attracted to each other by a magnetic field, the slider will move in sequence up, right, down, left. In this case, before applying voltage to the fourth coil 412 to move the slider 405 down, the current in the second coil 408 decreases to the interval of the current maintaining the magnetic extension, and the supply of voltage to the third coil 410 stops; before applying voltage to the first coil 406 to move the slider 405 to the left, the current in the fourth coil 412 decreases the magnetic extension is maintained, and the voltage supply to the second coil 408 is stopped; and thus, sequential sequence control is performed in accordance with consecutive XPR dithering cycles.

When power is applied to the fourth coil 412, driving the slider 405 down, the drive current of the second coil is reduced to the range of maintaining the current of attraction. On the one hand, the magnetic attraction force of the second coil 408 and the second magnet 409, you can hold the slider 405 at the end point after moving to the right (the second coil is powered to drive the slider), that is, the slider 405 can be held to the right, and then moved to the right down (the fourth coil is energized to drive the slider). This makes the process of moving the slider 405 relatively stable when performing the corresponding "up, right, down, left" movements.

This ensures the stability of the XPR dithering projection, making it less susceptible to vibration shifts due to external vibration factors (for example, road surface vibrations while driving in real time, user vibrations while walking) when used in scenarios such as projection detection in a moving car or projection detection in a VR headset, etc. On the other hand, reducing the supply current of the second coil 408 from a higher drive current to a magnetic extension maintenance current interval can effectively reduce the friction between the upper part of the slider 405 and the right end stop of the first X-axis guide rail 401, as well as the friction between the lower part of the slider 405 and the right end stop of the second X-axis guide rail while maintaining magnetic extension, effectively reduce the heat output of the guide platform with slider when performing continuous XPR dithering projection.

In some embodiments, the display chip 6 is a 0.47 DMD display chip; the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

Preferably, the content displayed by moving up pixels with vision persistence and moving up pixels with vision persistence corresponds to the same type of image; the content displayed by pixels moving to the left with vision persistence and pixels moving to the right with vision persistence corresponds to the same type of image.

Preferably, all content displayed by pixels with vision persistence in the same direction in different XPR dithering cycles is the corresponding visible light images or the corresponding combined images.

In some embodiments, the XPR dithering unit 4 includes a guide platform with a slider that has only one direction of axial movement corresponding to the right-up/left-down movement. Its guide moves the slider from the upper-right position to the lower-left position and from the lower-left position to the upper-right position. In the drive unit, there is only a first coil for moving the slider up to the right and a second coil for moving the slider up to the left, and the first and second coils are sequentially turned on and off as they move to form a continuous XPR dithering cycle.

In some embodiments, the display chip 6 is a 0.66 DMD display chip; the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

Preferably, all content displayed by pixels with vision persistence in the same direction in different XPR dithering cycles is the corresponding visible light images or the corresponding combined images.

In this embodiment, based on the design of the infrared thermal imaging display system in the above embodiment, this embodiment actually also offers a 4K image acquisition method that includes:

obtaining a thermal image of the target scene and obtaining a visible light image of the target scene;

forming a combined image by combining an infrared thermal image of the target area of a heat-emitting object with a visible light image;

control of the display chip for performing a projection display of the combined image and the visible light image;

control of the XPR dithering unit during projection display, so that the display chip performs dithering;

during the completion of each XPR dithering cycle, the display chip displays at least 2 frames of displayed images, and the displayed multi-frame images include at least 1 frame of the combined image and at least 1 frame of visible light image.

In some embodiments, the display chip is a 0.47 DMD display chip; the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

In addition, the content displayed by moving up pixels with vision persistence and moving up pixels with vision persistence corresponds to the same type of image; the content displayed by pixels moving to the left with vision persistence and pixels moving to the right with vision persistence corresponds to the same type of image.

In addition, all the content displayed by pixels with vision persistence in the same direction in different XPR dithering cycles is the corresponding visible light images or the corresponding combined images.

In some embodiments, the display chip is a 0.66 DMD display chip; the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

In addition, all content displayed by pixels with vision persistence in the same direction in different XPR dithering cycles is the corresponding visible light images or the corresponding combined images.

It is obvious to those skilled in the art that the present disclosure is not limited to the details of the exemplary embodiments described above and that it can be implemented in other specific forms without departing from the spirit or essential features of the present disclosure. Accordingly, the embodiments should be considered as exemplary and not limiting from any point of view, and the scope of the present disclosure is limited to the attached claim, and not to the above description, and therefore the invention includes all changes that fall within the meaning and scope of the equivalent elements of the claim. No designations in the drawings used in the claims should be considered as limiting the corresponding claims.

What is claimed is:

1. An infrared thermal imaging display system, comprising an infrared thermal image acquisition unit, a visible light image acquisition unit, an image combining unit, an XPR dithering unit, a control unit, and a display chip;

wherein the infrared thermal image acquisition unit is used for obtaining infrared thermal images of the target scene; the visible light image acquisition unit is used for obtaining visible light images of the target scene; the image combining unit is used for extracting an image of the target area of the heat-emitting object from the obtained thermal images, and for combining the extracted image of the target area of the heat-emitting object with a visible light image to obtain the combined image;
the controller of the control unit is used for projecting the combined image obtained by the image combining unit and the visible light image obtained by the visible light image acquisition unit using the display chip, and for controlling the XPR dithering unit when controlling the projection display, so that the display chip performs dithering; and
during the completion of each XPR dithering cycle, the display chip displays at least 2 frames of displayed images, and the displayed multi-frame images comprise at least 1 frame of the combined image and at least 1 frame of visible light image.

2. The infrared thermal imaging display system according to claim 1, wherein the display chip is a 0.47 DMD display chip;
the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

3. The infrared thermal imaging display system according to claim 2, wherein
the content displayed by moving up pixels with vision persistence and moving up pixels with vision persistence corresponds to the same type of image; and
the content displayed by pixels moving to the left with vision persistence and pixels moving to the right with vision persistence corresponds to the same type of image.

4. The infrared thermal imaging display system according to claim 1, wherein the display is a 0.66 DMD display chip;
the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

5. The infrared thermal imaging display system according to claim 2, wherein all content displayed by pixels with vision persistence in the same direction in different XPR dithering cycles is the corresponding visible light images or the corresponding combined images.

6. A 4K image acquisition method, wherein the method comprises obtaining a thermal image of the target scene and obtaining a visible light image of the target scene;
forming a combined image by combining an infrared thermal image of the target area of a heat-emitting object with a visible light image;
control of the display chip for performing a projection display of the combined image and the visible light image;
control of the XPR dithering unit during projection display so that the display chip performs dithering; and
during the completion of each XPR dithering cycle, the display chip displays at least 2 frames of displayed images, and the displayed multi-frame images comprises at least 1 frame of the combined image and at least 1 frame of visible light image.

7. The 4K image acquisition method according to claim 6, wherein the display chip is a 0.47 DMD display chip;
the XPR dithering unit rapidly moves the display chip by half a pixel in the order of up, right, down, and left to form an XPR dithering cycle, so that the same pixel forms 4 pixels with vision persistence in different positions, each micro-mirror on the display chip takes part in the imaging of 4 pixels with vision persistence at a frequency of 240 Hz, and makes the content displayed in 2 of the pixels with vision persistence correspond to the combined image, so that the content displayed in the other two pixels with vision persistence is the corresponding visible light image.

8. The 4K image acquisition method according to claim 7, wherein
the content displayed by moving up pixels with vision persistence and moving up pixels with vision persistence corresponds to the same type of image; and
the content displayed by pixels moving to the left with vision persistence and pixels moving to the right with vision persistence corresponds to the same type of image.

9. The 4K image acquisition method according to claim 6, wherein the display is a 0.66 DMD display chip,
the XPR dithering unit quickly moves the display chip in the order of top-right and bottom-left to form an XPR dithering cycle, so that the same pixel forms two pixels with vision persistence in different positions, each micro-mirror on the display chip takes part in the imaging of two pixels with vision persistence, so that the content displayed by one pixel with vision persistence is the corresponding visible light image, and the content displayed by another pixel with vision persistence is the corresponding combined image.

10. The 4K image acquisition method according to claim 7, wherein all the content displayed by pixels with vision persistence in the same direction in different XPR dithering cycles is the corresponding visible light images or the corresponding combined images.

* * * * *